United States Patent [19]

Terada et al.

[11] Patent Number: 5,561,742
[45] Date of Patent: Oct. 1, 1996

[54] MULTIPLE-ROBOT CONTROL AND INTERFERENCE PREVENTION METHOD

[75] Inventors: Tomoyuki Terada; Atsushi Watanabe, both of Oshino-mura, Japan

[73] Assignee: Fanuc Ltd., Minamitsuru-gun, Japan

[21] Appl. No.: 122,428

[22] PCT Filed: Jan. 10, 1993

[86] PCT No.: PCT/JP93/00055

§ 371 Date: Sep. 24, 1993

§ 102(e) Date: Sep. 24, 1993

[87] PCT Pub. No.: WO93/14910

PCT Pub. Date: May 8, 1993

[30] Foreign Application Priority Data

Jan. 28, 1992 [JP] Japan ...................... 4-035816

[51] Int. Cl.⁶ ........................... B25J 9/00; G06F 9/00
[52] U.S. Cl. .............................. 395/90; 395/83; 395/84; 395/93; 364/461
[58] Field of Search .................. 395/90, 83, 84, 395/93; 364/461

[56] References Cited

U.S. PATENT DOCUMENTS

| | | | |
|---|---|---|---|
| 4,578,757 | 3/1986 | Stark ......................... | 395/90 |
| 4,615,902 | 10/1986 | Falcoff et al. ............... | 395/84 |
| 4,633,385 | 12/1986 | Murata et al. .............. | 395/83 |
| 4,862,373 | 8/1989 | Meng ........................ | 395/90 |
| 4,890,241 | 12/1989 | Hoffman .................... | 395/90 |
| 4,940,925 | 7/1990 | Wand et al. ................ | 395/93 |
| 5,179,329 | 1/1993 | Nishikawa et al. .......... | 395/83 |
| 5,204,942 | 4/1993 | Otera et al. ................ | 395/90 |
| 5,303,384 | 4/1994 | Rodriguez et al. .......... | 395/89 |

FOREIGN PATENT DOCUMENTS

| | | |
|---|---|---|
| 59-205601 | 11/1984 | Japan. |
| 60-5968 | 2/1985 | Japan. |
| 63-289606 | 11/1988 | Japan. |
| 3002906 | 1/1991 | Japan. |
| 4019084 | 1/1992 | Japan. |

OTHER PUBLICATIONS

Zuofeng Li, et al. "Motion Space Analysis of an Object Handled by Two Robot Arms", Proceedings of the 28th IEEE conference on decision and control, pp. 2487–2493, Dec. 15, 1989, Tampa, Florida.

Primary Examiner—George B. Davis
Attorney, Agent, or Firm—Staas & Halsey

[57] ABSTRACT

A multiple robot control method in which a spatial region is defined for each of a plurality of robots. The spatial region is defined according to a region which a robot occupies and the spatial region depends on a position and orientation of each robot. The robots are mounted close to each other and may be commanded so as to be operated at the same time. The spatial region for a robot is defined at every unit operation command, and is defined by one or two planes which are parallel to each other in the X-Z plane, and move horizontally in a specified direction (Y-axis direction) for all robots. It is then determined whether a defined spatial region for a first robot crosses a defined spatial region for a second robot. If it is found that the defined spatial regions do not cross each other, the first robot is operated according to an operation command since it is ensured that no interference between robots occurs. If it is found that the spatial regions do cross each other, operation of the first robot is stopped, and the first robot is kept in a waiting state until the spatial region of the first robot moves depending on the operation of the second robot such that the spatial regions no longer cross each other.

10 Claims, 3 Drawing Sheets

MULTIPLE-ROBOT CONTROL AND INTERFERENCE PREVENTION METHOD

BACKGROUND OF THE INVENTION

1. Field of the Invention

The present invention relates to a multiple-robot control method, wherein a plurality of robots mounted close to each other are controlled so that there is no interference between adjacent robots when the robots are simultaneously operated according to a command.

2. Description of Related Art

If a plurality of robots mounted close to each other execute a task in cooperation with each other, operation efficiency can be improved. However, care must be taken so that there is no interference between these closely mounted robots. For this reason, a conventional control method exists for predicting a region where there is the possibility of interference between robots, and for letting one robot wait so as not to enter the region for the duration when the other robot exists in the region and is operating therein. The conventional control method prevents two robots from being simultaneouly operated in the same region by taking advantage of communication between robots.

However, it is not easy to predict the region where the robots interfere with each other. If the region is broadly set in consideration of a sufficient margin such that these robots have no interference with each other, the time during which one robot exists in the region set becomes long. As a result, a waiting period for the other robot also becomes long; and for this reason, the operating efficiency is lowered. On the other hand, if a minimum region where the robots have no interference with each other is predicted and is preset to enhance the operating efficiency, it is necessary to perform a complicated computation for the prediction. Therefore, accurate prediction is difficult to make. Further, it is considerably difficult to preset the timing of communication between the robots; and for this reason, there is the disadvantage that there is an increase in the number of processes required to effectively operate the plurality of robots so as not to cause interference in the predicted region.

SUMMARY OF THE INVENTION

An object of the present invention is to provide a multiple-robot control method, wherein there is no need to predict a region where a plurality of robots interfere with each other, operation programs are freely taught to each robot, and no interference occurs during the operation of the robots.

To achieve the above object, the present invention provides a multiple-robot control method, comprising the steps of: defining a spatial region for keeping a region necessary to the operation every unit operation command for each of a plurality of, for example, vertically jointed type robots which are mounted close to each other, and commanded so as to be operated at the same time; determining whether the defined spatial region crosses another spatial region which is defined similarly and kept for another robot; and determining whether it is ensured that no interference between robots occurs.

Further, the present invention provides a multiple robot control method, comprising the steps of: detecting whether a spatial region, which is defined and kept for a first robot, cross a spatial region which is defined and kept relative to another robot; and, controlling so that the first robot is stopped operating according to the detected result, and is kept in a waiting state until the spatial region of the first robot moves depending on an operation of the other robot, and the spatial regions of both robots do not cross each other.

Preferably, the occupied spatial region of each robot is defined by one or two planes which are parallel to each other and move horizontally in a specified direction.

More preferably, the plane for defining the spatial region of each robot is set to a position such that the plane is tangential to a sphere or cylinder obtained by assuming at least one of a sphere covering a wrist and hand of the robot, a sphere covering an elbow joint of the robot, and a cylinder representing a base of the robot, and receives it within the region defined by the plane. Further, the plane is set to a position such that the plane is tangential to the sphere or cylinder detected as being positioned the furthest from the robot base in the moving direction of the planes, of the at least two of spheres or cylinder which are assumed from among a sphere covering a wrist and a hand of the robot, a sphere covering an elbow joint of the robot, and a cylinder representing a base of the robot, and received it within the region defined by the plane. In this case, the central position of the assumed sphere covering the wrist and the hand of the robot is set to a position where a predetermined offset value is added to the wrist center position, which is one of operating command positions. The radius of the sphere is determined on the basis of the structure of the wrist and the hand.

Furthermore, preferably, the unit operation command for defining the spatial region of each robot is equivalent to one block of operating programs which are taught to the robot, or is equivalent to data on which the operating command taught to the robot is interpolated.

Still more preferably, the spatial region closest to an adjacent robot of a spatial region newly defined when the unit operation to each robot is started, and a spatial region defined just before the operation, is maintained as a spatial region for current operation until the next unit operation is started. Then, data on the maintained spatial region is transmitted to the adjacent robot. The robot receiving the data on a maintained spatial region determines whether or not the spatial region crosses the spatial region of the transmitting-side robot, and it is determined whether it is ensured that both robots have no interference with each other. If the receiving-side robot finds that the spatial region of the receiving- side robot crosses the spatial region of the transmitting-side robot, the receiving-side robot is stopped operating, and is controlled so as to be kept in a waiting state until tire spatial region of the receiving-side robot is moved depending on the operation of the transmitting-side robot, so that the spatial regions of both robots do not cross each other.

As described above, according to the present invention, the occupied spatial region of each robot can be readily defined each time an operation command is given to a robot. Thus, the plurality of robots are controlled so that the opportunity for a robot to execute a unit operation according to an operation command occurs only when it is determined that the occupied spatial region of one robot does not enter the occupied spatial region defined alike of another robot. Further, when a robot terminates a unit operation, the occupied spatial region of the robot is defined and stored depending on the robot's position (orientation) at that time, thereby constituting a region inhibiting one robot from being entered by the occupied spatial region of the other robot.

DETAILED DESCRIPTION OF THE PREFERRED EMBODIMENTS

Figure 1:
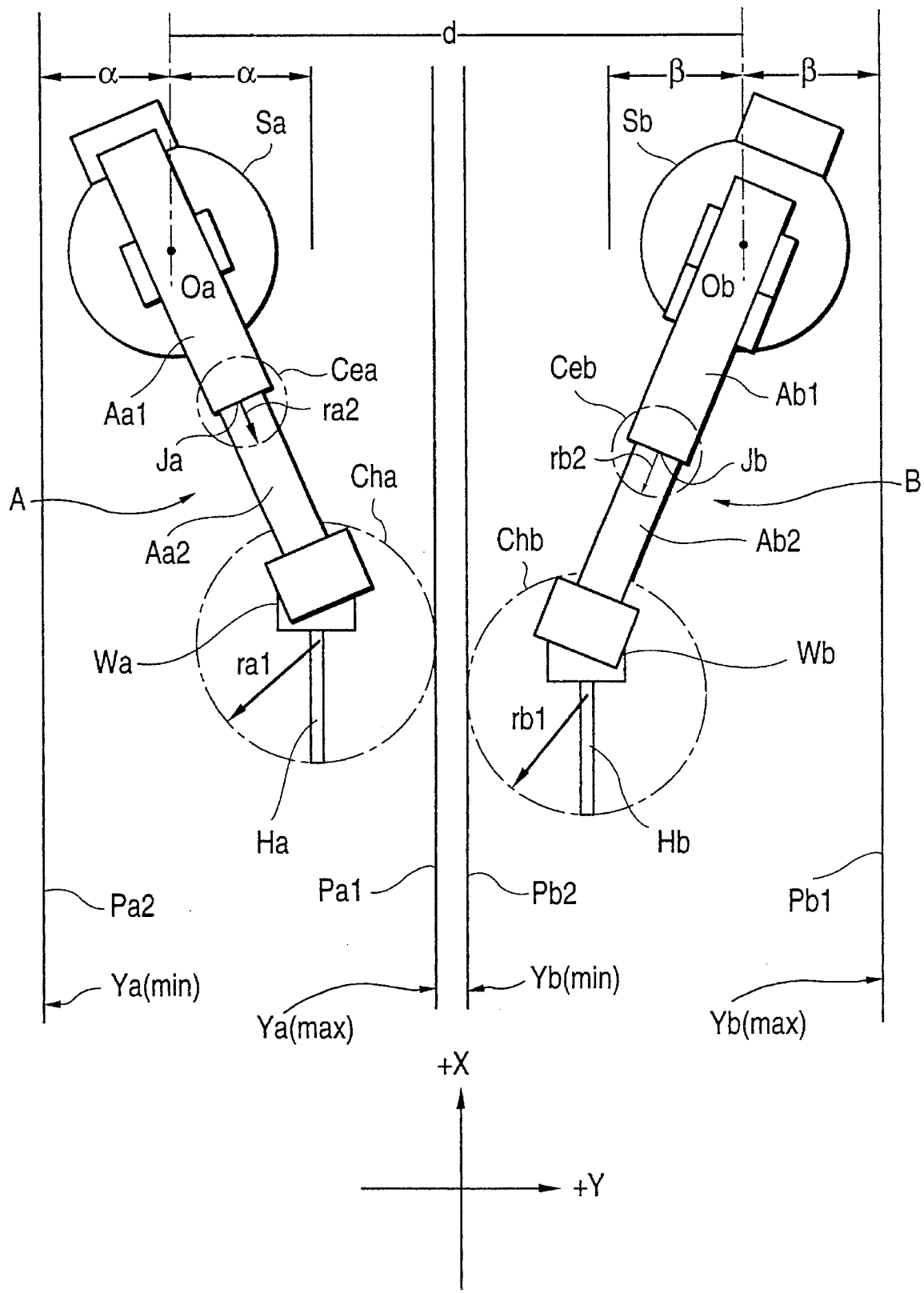
FIG. 1 is a top view showing spatial regions for robots in accordance with a preferred embodiment of the present invention.

FIG. 1 is a top plan view illustrating a preferred embodiment of the present invention, and shows a state in which two robots A and B are mounted on a common plane through bases Sa and Sb, respectively. In FIG. 1, Aa1 and Aa2 of the robot A denote arms, Ja denotes an elbow joint portion, Wa denotes a wrist, and Ha denotes a hand. Further, Ab1 and Ab2 of the robot B denote arms, Jb denotes an elbow joint portion, Wb denotes a wrist, and Hb denotes a hand.

In accordance with the preferred embodiments of the present invention a spatial region where each respective robot operates is set for every unit operation, and the robots are controlled so that the respective spatial regions where the robots are operating do not cross each other, thereby preventing interference from occurring between the robots.

As shown in FIG. 1, a line connecting the centers Oa and Ob of the bases Sa and Sb is regarded as the Y-axis, and a line on the mounting plane and perpendicular to the Y-axis direction is regarded as the X-axis. Further, the direction perpendicular to the mounting plane (X-Y plane) is regarded as the Z-axis. Thus, an X-Y-Z coordinate system is defined. The spatial region for each robot is defined by one or two X-Z planes. More specifically, each robot stands vertically depending on an orientation for unit operation, and occupies a spatial region defined by one or two planes shifting in the Y-axis direction in accordance with the operation of the robot.

The spatial region is described below with reference to an example shown in FIG. 1. The robot A occupies a region which is equivalent to a spatial region defined by X-Z planes Pa1 and Pa2. Similarly, the robot B occupies a region which is equivalent to a spatial region defined by X-Z planes Pb1 and Pb2. In such a manner, each of the planes (Pa1, Pa2, Pb1, Pb2) is defined by an X-Z plane, so that these planes are parallel to each other. As will be described in greater detail later, if circumstances permit, the occupied region of the robot A may be defined as a left-side (Y-axis negative direction) region of the plane Pa1; and, the occupied region of the robot B may be defined as a right-side (Y-axis positive direction) region of the plane Pb2.

As described above, the spatial region which a robot under a posture at the time occupies is set at every unit operation. In other words, the position (Y-coordinate value) of an X-Z plane defining the spatial region is determined at every unit operation. The operation of a robot is controlled unless the spatial region determined thus and a spatial region determined for another (adjacent) robot cross each other. More particularly, the operation of a robot is controlled unless the X-Z plane defining one spatial region crosses over the X-Z plane defining the other spatial region. Thus, it is assured that no interference occurs between robots.

Next, in case of defining spatial regions of the robots with two X-Z planes, it will be explained below how to determine a position (Y-coordinate value) on each plane with reference to the robot A shown in FIG. 1.

In the robot A having an orientation as shown in FIG. 1, the wrist Wa or the hand Ha is situated at the closest position to the adjacent robot B side, or the maximum position in the Y-axis direction. As shown in FIG. 1, a sphere Cha covering the wrist Wa and the hand Ha is assumed. The X-Z plane Pa1 is set to a position (Y-coordinate value) such that the plane Pa1 contacts the sphere Cha and receives it within the spatial region defined by the plane Pa1 (in FIG. 1, that position is shown as Ya (max)). If only the plane Pa1 is set in this manner, if the adjacent robot B (the spatial region thereof) does not enter the spatial region of the robot A beyond the plane Pa1, it is ensured that no interference occurs between robots. In this case, the central position of the sphere Cha is determined by assigning a specified offset amount to a wrist center position which is one of the operating command positions to the robot. Further, a radius ra1 is determined on the basis of the mechanism of the wrist Wa and the hand Ha. In such a case, if the position of the wrist Wa changes according to an operation command, the position of the sphere Cha also changes. Therefore, the X-Z plane Pa1 defining the spatial region for robot A moves in parallel and in the Y-axis direction, and thus the spatial region is changed.

In a state as shown in FIG. 1, the position at which the hand Ha or the wrist Wa is situated has the maximum Y-coordinate value in the robot A, as previously described. For this reason, the X-Z plane Pa1 is set on the basis of the position of the sphere Cha covering the wrist Wa and the hand Ha. However, if arms Aa1 and Aa2 are bent, and the Y-coordinate value of the elbow joint Ja becomes greater in the operation process, the Y-coordinate value of the wrist Wa and the hand Ha becomes smaller. Therefore, there is the possibility that the Y-coordinate value of the elbow joint Ja becomes greater than that of the wrist Wa and the hand Ha. In such a case, a sphere Cea covering the elbow joint Ja is assumed in order to set an appropriate spatial region. In the case where the Y-axis coordinate value of the sphere Cea is greater than that of the sphere Cha covering the wrist Wa and the hand Ha, the X-Z plane Pa1 is set to a position (Y-coordinate value) such that the plan Pa1 is tangential to the sphere Cea, and the sphere Cea is received in the spatial region defined by the plane Pa1. Further, the central position of the sphere Cea covering the elbow joint Ja is determined according to the elbow joint position which is one of the operation command positions to the robot, and a shape of the elbow joint. In this case, when the position of the sphere Cea changes as the elbow joint Ja is changed according to the operation command, the X-Z plane Pa1 defining the spatial region moves in parallel and in the Y-axis direction, thus the spatial region being shifted.

The above setting of the plane Pa1 has been explained on the assumption that either of the Y-coordinate values of the sphere Cha covering the wrist Wa and the hand Ha, or the Y-coordinate values of the sphere Cea covering the elbow joint Ja is greater than the Y-coordinate value of the base Sa. However, when either of the Y-coordinate values of the sphere Cha covering the wrist Wa and the hand Ha, or the Y-coordinate values of the sphere Cea covering the elbow joint Ja becomes smaller than the Y-coordinate value of the base Sa, it is necessary to consider the possibility that the adjacent robot B interferes with the base Sa of the robot A. In such a case, the base Sa is regarded as being a cylinder having a center extending from the center Oa of the base in the Z-axis direction, and the plane Pa1 is set to a position (Y-coordinate value) such that it is tangential to the cylinder representing the base Sa, and the cylinder is received in the spatial region defined by the plane Pa1. The center of the cylinder representing the base Sa is determined on the basis of the mounting position of the robot. Further, the radius α of the cylinder is determined on the basis of a shape of the base. As a matter of course, the position of this cylinder is always constant regardless: of an operation of the robot.

Summarizing the above description, in the case of determining the setting position Ya(max) of one X-Z plane Pa1 defining the spatial region, first, respective segments on the Y-axis of the sphere Cha covering the wrist Wa and the hand Ha, the sphere Cea covering the elbow joint Ja and the cylinder representing the base Sa are compared, and the sphere or the cylinder, which has the greatest Y-coordinate value, is specified. Then, the plane Pa1 is set to the Y-coordinate value such that the plane Pa1 abuts the specified sphere or cylinder, and the sphere and the cylinder are received in the spatial region defined by the plane Pa1.

On the other hand, in the case of determining the other X-Z plane Pa2 defining the spatial region of the robot A, if it is previously found that any of segments on the Y-axis of the sphere Cha covering the wrist Wa and the hand Ha and the sphere Cea covering the elbow joint Ja are not smaller than the segment on the Y-axis of the cylinder representing the base Sa, the plane Pa2 is set to the Y-coordinate value Ya(min) such that it is tangential to the cylinder representing the base Sa, and the cylinder is received in the spatial region.

If a third robot is not mounted on the Y-axis negative direction side (on the left of the robot A in FIG. 1), it is not necessary to consider that other robots enter the spatial region occupied by the robot A beyond the X-Z plane Pa2. Therefore, the setting of the position of the plane Pa2 causes little problem. Further, the plane Pa2 is not set in such a case, and the spatial region may be regarded as a region in the Y-axis negative direction from the plane Pa1. But, if a third robot is mounted on the left of the robot A, there is a need to consider interference with the third robot, so that it is a significant matter where the plane Pa2 should be set. In this case, the spatial region must be defined by two X-Z planes (Pa1, Pa2). In accordance with an operation of the robot A, it would be necessary to determine the plane Pa2 in the same manner that an X-Z plane Pb2 is set in a robot B, which will be explained below.

Next, the setting of a spatial region for a robot B will be described below. This setting is basically performed with the same procedures as used in setting the spatial region for the robot A. First, a sphere Chb (radius rb1) covering a wrist Wb and a hand Hb and a sphere Ceb (radius Rb2) covering an elbow joint Jb are assumed, respectively, and a cylinder (radius β) representing a base Sb is further assumed. However, in the case of the robot B, the robot A exists in the Y-axis negative direction, or on the left side of the robot B. In view of this positional relation, first, respective segments on the Y-axis of the sphere Chb covering the wrist Wb and the hand Hb, the sphere Ceb covering the elbow joint Jb and the cylinder representing the base Sb, are compared, and the sphere or the cylinder which has the smallest Y-coordinate value, is specified from among them. Then, one X-Z plane Pb2 is set to the Y-coordinate value Yb (min) such that the plane Pb2 is tangential to the specified sphere or cylinder, and the sphere and the cylinder are received in the spatial region defined by the plane Pb2. The other X-Z plane Pb1 is set to the Y-coordinate value Yb(max) such that the plane Pb1 abuts on the cylinder representing the base Sb, and the cylinder is received in the spatial region defined by the plane Pb1. Further, in the same manner as described with respect to the robot A, the plane Pb1 is not specifically set, and the spatial region occupied by the robot B may be defined as a region in the Y-axis positive direction from the X-Z plane Pb2.

When the spatial regions of the two robots A and B thus set do not cross each other, it is ensured that no interference occurs between these robots, as previously explained. Therefore, the robots are controlled so that the spatial regions of these robots do not cross each other.

Assuming that the robots A and B have the origins Oa and Ob, and in the X-Y-Z coordinate system have X-, Y-, Z- axis direction in common, respectively, the following equation is established when the spatial regions of two robots do not cross each other.

$$Ya(max) - Yb(min) < d, \qquad (1)$$

where d is the distance between the origins Oa and Ob.

Figure 2:
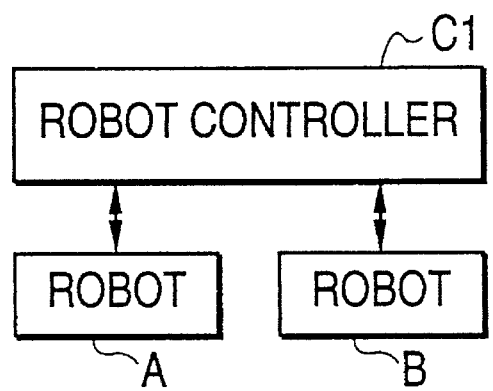
FIG. 2 is a configuration diagram of a system for controlling a plurality of robots by one robot controller.
Figure 3:
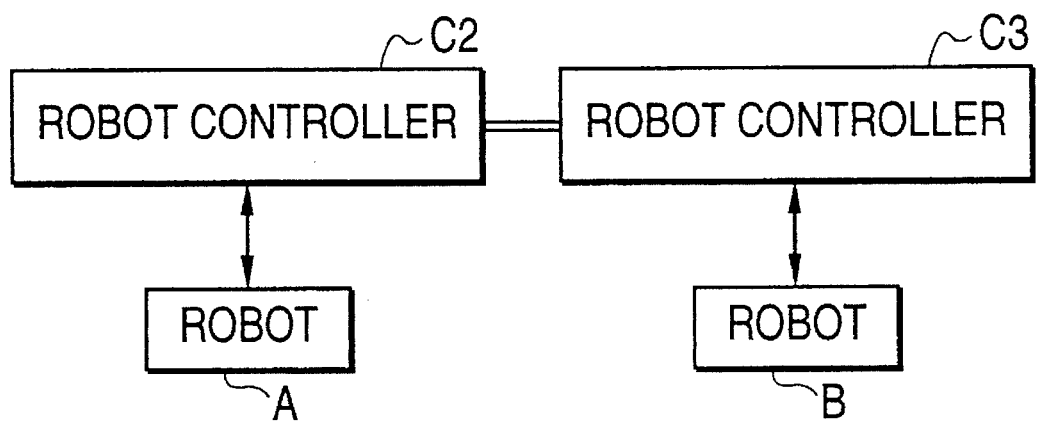
FIG. 3 is a configuration diagram of a system for controlling a plurality of robots by robot controllers connected by communication.

FIGS. 2 and 3 are diagrams showing a configuration of a control system in the case where a plurality of robots are simultaneously operated to execute a task. The configuration shown in FIGS. 2 and 3 is a conventional configuration. FIG. 2 shows a configuration in the case where the plurality of robots are controlled by a single robot controller C1. In FIG. 2, the two robots A and B are connected to the controller, but other robots may be further connected thereto. On the other hand, FIG. 3 shows a configuration in the case where a robot controller C2 for the robot A and a robot controller C3 for the robot B are connected by communication means. Further, as shown in FIG. 3, the robot controllers C2 and C3 are connected to the robots A and B, respectively, but two or more robots may be connected to each controller.

Figure 4:
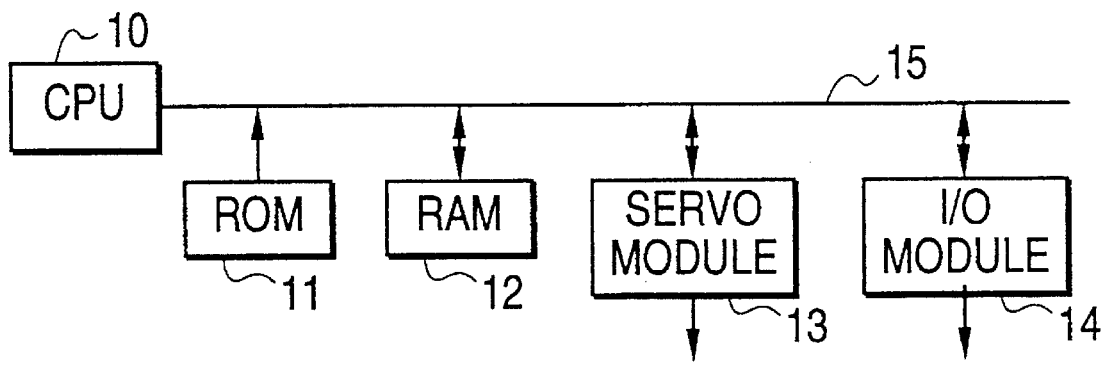
FIG. 4 is a block diagram showing main parts of the robot controller.

FIG. 4 is a block diagram showing a configuration of a robot controller. This robot controller has the same configuration as a conventional controller, and is known. To a processor (CPU) 10 are connected, through a bus 15, a ROM 11 storing system programs; a RAM 12 storing teaching programs for each robot, various setting values, parameters or the like; a servo module 13 for driving a servo mechanism (servo motor) of each robot; and, an I/O module 14 for inputting and outputting signals from various sensors of each robot or an actuator, through the bus 15. The function of each of the above elements is known, and a detailed description is therefore omitted here.

Figure 5:
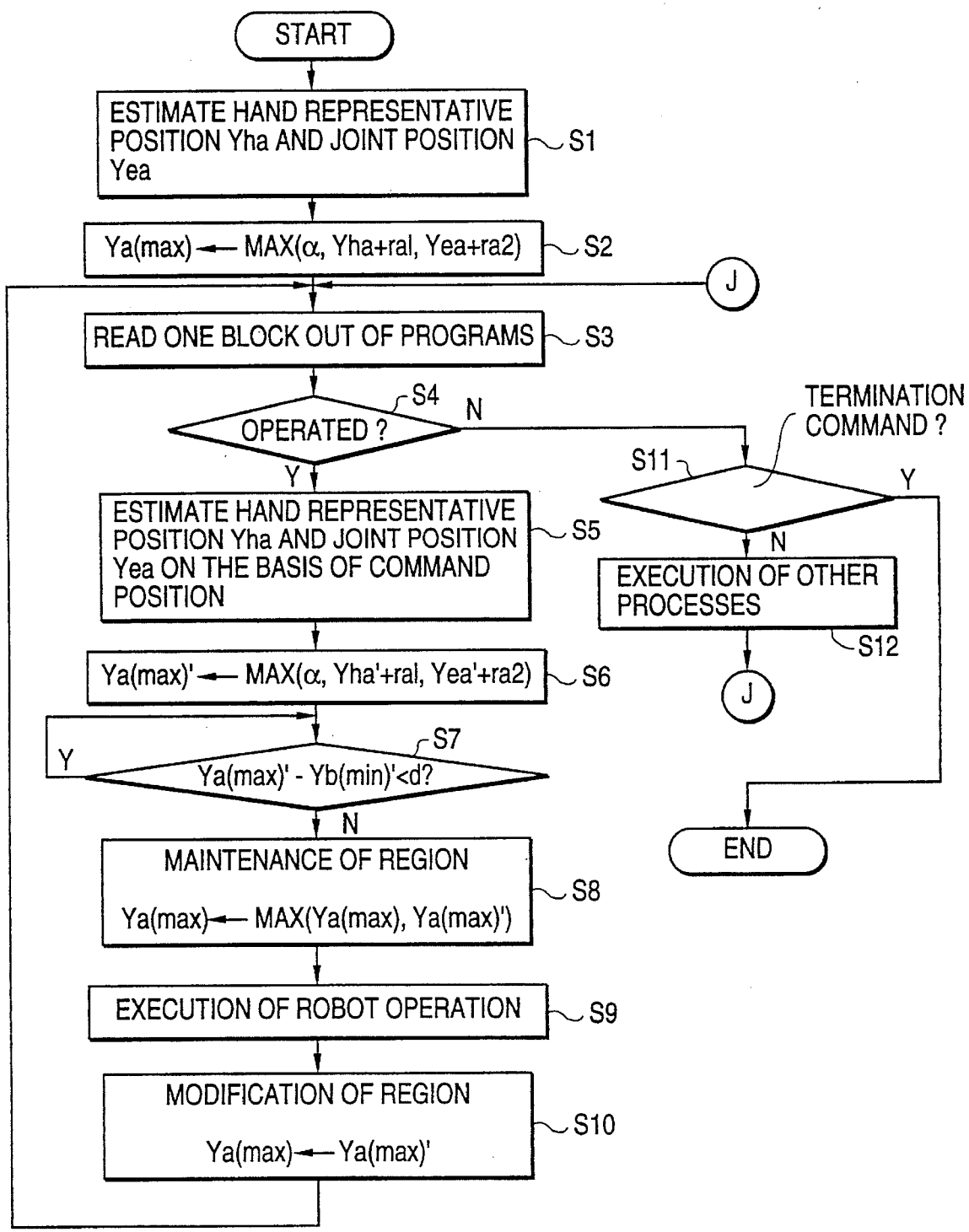
FIG. 5 is a flowchart showing robot control procedures in accordance with the preferred embodiment of the present invention.

Referring now to a flowchart shown in FIG. 5, an operating process according to the preferred embodiment will be described below. The preferred embodiment employs the control system shown in FIG. 3. Each operation of the robots A and B is commanded on the basis of individual X-Y-Z coordinate systems having the X-, Y-, and Z-axis direction in common. The following is mainly the explanation relating to an operating process of the robot A. Further, FIG. 5 is a flowchart of the operating process on the basis of operating programs which are! already taught to the robot A shown in FIG. 1.

First, prior to the operating process, various parameters concerning the robot A are stored in the robot controller C2. More specifically, the following data are stored: an offset amount to the central position of the wrist Wa (operation command position to the robot) for determining the central position (hereinafter referred to as hand representative position) of the sphere Cha covering the wrist Wa and the hand Ha of the robot A; a radius ra1 of the sphere Cha; a radius ra2 of the sphere Cea covering the elbow joint Ja; a radius α of the section of the cylinder representing the base Sa and a distance d between two robots adjacent to each other.

When an operation command for the robot A is input, the processor 10 of the robot controller C2 first estimates a current position (central position of the wrist Wa) of the robot A and also estimates a position of the elbow joint Ja during this process. Then, a hand representative position is calculated on the basis of the estimated current position (central position of the wrist Wa) and a specified offset amount to a hand representative position (Step S1). In this case, data required for the hand representative position and the elbow joint position is only Y-coordinate values Yha and Yea.

Next, three values, namely the radius α of the base preset for the robot A, a value (Yha+ra1) determined by adding the radius ra1 of the sphere Cha and the hand representative position Yha, and a value (Yea+ra2) determined by adding the radius ra2 of the sphere Cea and the position. Yea of the elbow joint Ja, are compared; and the greatest value of these three values is stored in a register as a Y-coordinate value Ya(max) of the X-Z plane Pa1 for defining an occupied spatial region of the robot A (Step S2). In this case, it is assumed that the robot B does not go beyond the other X-Z plane Pa2 defining the occupied spatial region of the robot A, so that it is not necessary to set a Y-coordinate value of the plane Pa2. In other words, the occupied spatial region of the robot A is set as a region having a Y-coordinate value smaller than the plane Pa1. The maximum value Ya(max) stored in the register is transmitted to the robot controller C of the robot B, and is stored in memory means of the controller C. In this case., during the operating process, a judgement is made whether or not the X-Z plane Pb2 defining the spatial region of robot B is beyond the plane Pa1 which is set to the Ya(max) value of the robot A. If the plane Pb2 is beyond the plane Pa1, the operation of the robot B is interrupted.

Subsequently one block (a line in programs, or unit operation command) is read according to the taught operation programs (Step S3), and it is judged whether or not the command is an operation command (Step S4). Unless it is the operation command, then it is judged whether a termination command is commanded in the programs, or is inputted by an operator (Step S11). If the termination command is not issued, other commanded processings are executed (Step S12), and the sequence returns to Step S3. Further, if it is determined, at the next step S4, that the read command is an operation command, a hand representative position Yha' and an elbow joint position Yea' are estimated on the basis of the robot position according to the operation command, in the same manner as estimated in Step S1 (Step S5). Furthermore, a maximum value Ya(max)' of the spatial region when the operation command is executed is estimated, in the same manner as estimated at Step S2 (Step S6).

It is judged whether the following equation (2) is established by using the equation (1) on the basis of the maximum value Ya(max)' of the spatial region thus estimated, and a minimum value Yb(min)' of the current spatial region of the robot B, which is transmitted from the controller C3 of the robot B and stored in the memory means of the controller C2 of the robot A.

$$Ya(max)' - Yb(min)' < d \qquad (2)$$

Then, it is determined whether or not the robot A exists in a safe region where it does not interfere with the robot B, thus an interference check being executed (Step S7).

In the case where the above equation (2) is not established, and it is not ensured that no interference occurs, due to the cross of the spatial regions of the adjacent robots, the processing of Step S7 is repeatedly executed. In the meantime, the robot A is temporarily stopped operating, and is kept in a waiting state. On the other hand, the robot B is operated according to the operation command, and accordingly its spatial region is shifted depending on the operation of the robot. The minimum value Yb(min)' of the spatial region is transmitted to the robot controller C2 of the robot A, and the value of Yb(min)' in the above equation (2) is modified in Step S7 so that the equation (2) can be established. If the conditions described above are arranged, first, the greater value of either the maximum value Ya(max) or Ya(max)' before and after one operation is executed is selected as the maximum value Ya(max) of the spatial region, and is stored in the register (Step S8), thus the operation corresponding to this command is executed (Step S9).

The maximum value Ya(max) of the spatial region secured in Step S8 is transmitted to the robot controller C3 of the robot B, and is stored in memory means thereof. Then, during the operating process, it is judged whether or not the X-Z plane Pb2 defining the spatial region of the robot B is beyond the plane Pa1 which is set to the above maximum value Ya(max) of the robot A. If the plane Pb2 is beyond the plane Pa1, the robot B is stopped operating. In this case, the processing of Step S8 is executed, and the processing result is supplied to the robot B side. This means that the spatial region of the robot A is modified when the robot A moves from a certain point to the next point. However, during the operating process, if only any of the spatial regions which is greater than the other is selected and maintained, then it is safely ensured that interference with the robot A will not occur, based on the fact that the spatial region thus maintained of the robot B will not enter the secured spatial region of the robot A.

Subsequently, when the execution of the operation at Step S9 is complete, the position Ya(max)' of the X-Z plane Pa1 defining the occupied spatial region of the robot A after the operation is complete is stored in the register (Step S10). Then, the sequence returns to Step S3, and processing for the next block is executed there.

In the flowchart shown in FIG. 5, only processing concerning the robot A is described therein. Further, the processing concerning the robot B is also executed in the same manner as described for the robot A. However, in Step S2, three values, namely the value (−β) which is obtained by multiplying the base radius β preset for the robot B by minus 1, the value (Yhb+rb1) which is obtained by adding the radius rb1 of the sphere Chb to the hand representative position Yhb, and the value (Yeb+rb2) which is obtained by adding the radius rb2 of the sphere Ceb to the position Yeb of the elbow joint Jb, are compared, and the smallest value of these values is stored in the register as the minimum value of the spatial region, or Y-coordinate value Yb(min) of the X-Z plane Pb1 for defining a spatial region in which the robot B is received. Likewise, in Step S6, the minimum value Yb(min)' is the spatial region when the robot B is operated according to the operating command in the same manner as step S1 is obtained. In Step S8, the smallest value of the two data, namely the minimum values Yb(min) and Yb(min)' before and after one operation of the robot is executed, is stored in the register as the minimum value Yb(min) of the spatial region, and the occupied spatial region where the robot is operating is ensured.

The above-described operation has been explained in terms of the execution according to programs. In the case of teaching the operation to the robots, the same processing as described above is executed. In other words, there is a case where the operation is taught to one robot, while it is taught to the other robot, or the teaching operation is executed during the operation of the other robot. This teaching operation is the same process as shown in the flowchart of FIG. 5, except that Steps S3 and S4 of the flowchart shown in FIG. 5 are replaced with a process for making a judgement whether or not teaching commands are inputted, and Step S11 is replaced with a process for making a judgement whether or not the teaching termination command is inputted.

According to the above-described preferred embodiment, the interference check is performed with the operation command unit. However, the interference check may be performed for each interpolation point after interpolating calculation is executed. In other words, if it is determined, at Steps S4 of FIG. 5, that the inputted command is an operation command, each interpolation point is estimated by executing an interpolating calculation on the basis of the input command, and the hand representative position and the elbow joint position (Yha', Yea'; Yhb', Yeb') corresponding to each interpolation point are determined. Then, the processings of Steps S6 through S10 are repeatedly executed from the initial interpolation point, and when the final operation command is executed, a process for returning to Step S3 may be executed.

The above-described preferred embodiment is directed to a control for preventing interference between two robots from occurring, as shown in FIG. 1. However, even if many robots are further mounted, it is possible to execute a similar control for preventing interference between robots from occurring. For example, in FIG. 1, if a third robot is mounted on the left side of the robot A, the interference check between the robots A and C is performed in the same manner. In this case, the relation between the robots A and B shown in FIG. 1 is merely replaced as the relation between the robots C and A. However, in the robot A which is situated on the center position, three values, namely the value (−α) which is obtained by multiplying the base radius α preset for the robot A by minus 1, the value (Yha+ra1) which is obtained by adding the radius ra1 of the sphere Cha to the hand representative position Yha, and the value (Yea+ra2) which is obtained by adding the radius ra2 of the sphere Cea to the position Yea of the elbow joint Ja, are further compared in Step S2, and the smallest value of these is set as the minimum value of the spatial region (Y-coordinate value Ya(min). Then the spatial region which the robot A occupies is defined by two X-Z planes Pa1 and Pa2, which are set to the minimum value Ya(min) and the maximum value Ya(max), respectively. Further, if it is previously found that respective Y-coordinate values of the hand, wrist, and elbow joint of the robot A do not exceed the Y-coordinate value of the base Sa to become smaller, Ya(min) is determined as: Ya(min)=−α. Furthermore, in Step S6, the minimum value Ya(min)' of the spatial region when the operation command is executed, is estimated at the same time that the maximum value Ya(max)' is estimated. Likewise, in Step S8, the smallest value of two data, namely the minimum values Ya(min) and Ya(min)' of the spatial region before and after on operation is executed, is selected as the minimum value Ya(min) of the spatial region. Then, the minimum value Ya(min) is stored in the register together with the maximum value Ya(max) of the spatial region, thereby ensuring not only the maximum value but also the minimum value of the occupied spatial region of the robot A.

Further, in the case where a robot D is mounted on the right side of the robot B, the relation between the robots A and B shown in FIG. 1 is merely replaced as the relation between the robots B and D.

The above-described preferred embodiment uses positions of the elbow joints Ja and Jb of the robots as a factor for determining the spatial region where the robots are operated. However, in the case of a vertical multi-joint robot, it is seldom that the elbow joints Ja and Jb bend in the Z-axis direction to be positioned further from the origins Oa and Ob on the Y-axis than from its hand position. For this reason, in the case where the operation program such that the elbow joints Ja and Jb bend in the Z-axis direction and are position further from the origins Oa and Ob on the Y-axis than from its hand position is not taught in a robot teaching program, as described above, no positions of the elbow joints Ja and Jb robot teaching programs may be used as a factor for determining the spatial region. On the contrary, in the case of a robot such that the plurality of elbow joints of a robot may be positioned further from the origins Oa and Ob on the Y-axis than from its hand position, it is necessary to consider each of all elbow joints of the robot in order to determine the spatial region of the robot.

Further, in the above-described preferred embodiment, each robot has a common coordinate system in which the direction connecting between the origins Oa and Ob is regarded as a Y-axis direction, a mounting plane of the robot is regarded as a X-Y plane, and a spatial region, where each robot is received, is defined by one or two X-Z planes, and the moving direction of the robot is regarded as Y-axis direction. But there is no need to limit he plane defining the spatial region to the X-Z plane, and to limit the moving direction to Y-axis direction. In short, the spatial region of each robot is defined by the planes which move in the specified direction, and are parallel to each other throughout all concerned robots. Thus, in a normal operation having no interference, it is necessary that only a state in which the spatial region of each robot does not cross can be reasonably obtained. As described above, the occupied spatial region of the robot is defined by planes parallel to each other. However, it is not necessary that all of these robots be mounted on the identical plane.

As seen from the above explanation, according to the present invention, before the robot moves actually, the spatial region of the robot required for its movement is defined by the planes moving in parallel, so that a position (orientation) and one operation of the robot can be ensured. In the case where when a first robot executes one operation, and the first robot crosses the occupied spatial region of another robot, it is determined that there is the possibility of interference (in other words, it is not ensured that no interference occurs), and the operation of the first robot is stopped. In the meantime, the other robot is operating; as a consequence, the first robot waits until both robots are in a state in which their spatial regions do not cross each other. Then, when both robots reach a state in which their spatial regions do not cross each other, the first robot starts operating again. Therefore, according to the present invention, there is no need of complicated computation for predicting interference regions, and of presetting the timing of communication between the robots, so that operation program, s can be freely taught and executed relative to each robot. Thus, it is possible to reduce the number of processes for operating the robots.

We claim:

1. A multiple-robot control method for a plurality of robots which are mounted close to each other and are commanded to operate by unit operation commands, comprising the steps of:

defining a spatial region necessary for a three-dimensional operation of a robot for each of said plurality of robots at every unit operation command, wherein said defining a spatial region necessary for a three-dimensional operation of a robot comprises defining at least one plane for each robot, and wherein respective said at least one plane is parallel to another and moves horizontally in a specified direction according to movement of an associated robot;

determining whether a spatial region defined for a first robot crosses a spatial region defined for a second robot; and judging whether interference between robots occurs based upon the result of the determining step.

2. A multiple-robot control method according to claim 1, further comprising the steps:

determining that the spatial region defined for the first robot crosses the spatial region defined for the second robot; and controlling said robots so that said first robot is stopped operating, and is kept in a waiting state until the spatial region defined for at least one of the first and second robots shifts and the spatial regions defined for the first and second robots do not cross each other.

3. A multiple-robot control method according to claim 1, wherein said defining a spatial region necessary for a three-dimensional operation of a robot comprises setting said at least one plane defining a spatial region for a respective robot to a position such that said at least one plane is tangential to at least one of an assumed sphere coveting a wrist and hand of the robot, an assumed sphere covering an elbow joint of the robot, and a cylinder representing a base of the robot, and the at least one sphere and cylinder is contained in a region defined by the at least one plane.

4. A multiple-robot control method according to claim 1, wherein said defining a spatial region necessary for a three-dimensional operation of a robot comprises setting said at least one plane defining a spatial region for a respective robot to a position such that said at least one plane is tangential to at least one of an assumed sphere covering a wrist and hand of the robot, an assumed sphere covering an elbow joint of the robot, and a cylinder representing a base of the robot which is detected at a position which is furthest from the robot base in a direction of movement of said at least one plane.

5. A multiple-robot control method according to claim 4, wherein said defining a spatial region necessary for a three-dimensional operation of a robot comprises setting said a central position of said assumed sphere covering the wrist and the hand of the robot to a position where a predetermined offset value is added to the wrist center position, and determining the radius of the sphere on the basis of a structure of the wrist and hand.

6. A multiple-robot control method according to claim 1, wherein said unit operation command at which the spatial region of each respective robot is defined is equivalent to one block of an operating program which is taught to the respective robot.

7. A multiple-robot control method according to claim 1, wherein said unit operation command at which the spatial region of each respective robot is defined is equivalent to one unit during which an operating command taught to the robot is interpolated.

8. A multiple-robot control method according to claim 1, wherein said defining a spatial region at a unit operation command comprises maintaining the defined spatial region until a next unit operation is started, and transmitting data defining a maintained spatial region to an adjacent robot; and said determining comprises determining whether the spatial region of the robot receiving the maintained spatial region data crosses said spatial region of the robot transmitting the maintained spatial region data, thus determining whether the robots interfere with each other.

9. A multiple-robot control method according to claim 8, further comprising:

determining that the spatial region of the receiving robot crosses the spatial region of the transmitting robot;

stopping the operation of the receiving robot; and keeping the receiving robot in a waiting state until the spatial region of the receiving robot is moved, depending on the operation of the transmitting robot, such that the spatial regions of the robots do not cross each other.

10. A multiple-robot control method according to claim 1, wherein at least one of said plurality of robots is a vertical multi-joint type robot.

* * * * *